United States Patent Office 3,784,699
Patented Jan. 8, 1974

3,784,699
METHOD FOR INHIBITING MICROBIAL GROWTH EMPLOYING 2,6 - DIHYDROXY - 3,5-DITERT-BUTYL BENZOIC ACID
Togo Yamano, Nara, Kumiko Jono and Shigehiko Sato, Osaka, and Michio Nakanishi, Oita, Japan, assignors to Takeda Chemical Industries, Ltd., and Yoshitomi Pharmaceutical Industries, Ltd., Osaka, Japan
No Drawing. Filed Aug. 19, 1970, Ser. No. 65,261
Claims priority, application Japan, Aug. 20, 1969, 44/65,873
Int. Cl. A01n 9/24
U.S. Cl. 424—317
1 Claim

ABSTRACT OF THE DISCLOSURE 2,6-dihydroxy-3,5-di-tert.butylbenzoic acid and salts thereof have an antimicrobial activity and are applied to, for example, foodstuffs, detergents, cosmetics and the like.

---

This invention relates to a method for inhibiting microbial growth by the use of 2,6-dihydroxy-3,5-di-tert.butylbenzoic acid or a salt thereof.

Perishable substrates such as various foodstuffs, textiles, cosmetics and surface of human beings etc. are liable to the attack of microorganisms and often undergo putrefaction, spoilage, discoloration or produce an undesirable odor.

Heretofore, various antimicrobial agents have been employed for the purpose of inhibiting or retarding the formation or development of various groups of microorganisms including yeasts, molds and bacteria.

Of these agents, sorbic acid, p-hydroxybenzoic acid esters, salicylic acid, dehydroacetic acid, propionic acid and their alkali metal and alkaline earth metal salts have been most widely used in food products.

Moreover, nitrofuran derivatives, aqueous hydrogen peroxide solution, etc. have been used in various products, and recently, attention has been paid to dialkyl pyrocarbonates.

These known antimicrobial agents are effective against some microorganisms at relatively low concentrations, but substantially higher concentrations of these agents may be required before a satisfactory growth inhibition of other microorganisms occurs.

It is also well known that none of the known antimicrobial agents fully satisfy such requirements as low toxicity to mammals, strength of antimicrobial activity, life-span of the preserving action, and ease and safety in use. For instance, in the use of organic acids such as salicylic acid, sorbic acid, dehydroacetic acid, propionic acid and benzoic acid, their antimicrobial activity is considerably influenced by varying pH. That is to say, under circumstances, above pH 6.0, those acids are invariably low in this activity. Parahydroxybenzoic acid esters are decomposed by esterases and, accordingly, suffer reductions in the activity in the presence of esterases. Therefore, the use of such esters must be accompanied with inactivation of esterases by heating. Additionally, it is known that those esters form adducts with various proteins and their activity is reduced. When an antimicrobial agent is added to foods, it must have low toxicity to humans and/or animals and should have no adverse effect upon the flavor of the foods at the levels at which they are employed, and when it is added, for example, to laundry detergent, toilet soap, cosmetics and shampoo, it must be harmless to the skin.

Accordingly, it is an object of this invention to provide a method for inhibiting microbial growth by the use of 2,6-dihydroxy-3,5-di-tert.butylbenzoic acid or its salts, which are highly effective over a long period in inhibiting or disinfecting microbial growth in perishable substrate at low concentrations.

It is another object of this invention to provide a method for inhibiting microbial growth by the use of 2,6-dihydroxy-3,5-di-tert.butylbenzoic acid or a salt thereof which are relatively low toxic and harmless to the skin.

The active ingredient, 2,6-dihydroxy-3,5-di-tert.butylbenzoic acid, may be produced by reacting 4,6-di-tert.butyl resorcinol with carbon dioxide under heating. Salts of this compound as well as the free acid are effective in antimicrobial activity. Illustrative of preferred salts are alkali metal salts such as the sodium and potassium salts, or alkaline earth metal salts such as calcium salt, barium salt, and ammonium salt.

The antimicrobial compound is employed in an extremely broad range of substrates. It is satisfactorily employed in various kinds of detergents such as laundry detergent, toilet soap, shampoo, and other detergents since 2,6-dihydroxy-3,5-di-tert.butylbenzoic acid or its salts deposit on the textiles, skin, or hair, rendering them resistant to microorganisms without injurying the substrate.

In addition, the active ingredient used in this invention is applicable to various foods such as alcoholic liquors, e.g. refined sake, compound sake, beer and wine; vinegar; soy sauce; ketchup; jam; mash; vegetables and fruits including both dried and fresh; pickles made from farm products; milks; yoghurts; butter; margarines; cheese; ice cream; fruit juices such as apple juice, orange juice and tomato juice; soft drinks including synthetic juice; powdery juice; corn syrup; maple syrup; tofu (bean curd); breads; cakes; candies; smoked foods; meats and meat products such as bacon, ham, sausage; fish and fish meat products such as fish meat sausage, kamaboko (boarded fish paste) and chikuwa (fish paste roll); animal oils; fats; vermicelli and related foods such as dried or raw noodles; rice cake and related food. Aside from the items listed above, any perishable food may prove a suitable substrate.

In addition, the antimicrobial compound employed in this invention is useful in the inhibition of fermentation and degradation of starch in storage and the prevention of rots in fruits and vegetables.

The active ingredient used in this invention is also applicable to all the substrates to which the conventional preservatives may apply, inclusive of textile, fabric, cosmetics and the like.

This invention may be practiced in a suitable manner depending upon the type of substrate, object of treatment, and the stage and mode of processing, for example, by any of blending, incorporation, dissolution, dipping, spraying, instillation, impregnation and other techniques.

The active ingredient used in this invention may be used in a suitable manner, that is to say, in powdery form or as a solution which may be prepared either in situ or previously with the use of a suitable solvent.

All that is necessary is to ensure that the active ingredient will be evenly incorporated and dispersed to attain the objects of the invention. To obtain an even dispersion, the active ingredient may be admixed and diluted with a suitable vehicle or dispersing agent, either at the time of use or previously. The vehicle or dispersing agent includes, for example, sodium chloride, polyphosphates, chemical condiments, fatty acid esters and other surfactants, lactose, glucose and the like.

To practice this invention, the active ingredient, 2,6-dihydroxy-3,5-di-tert.butylbenzoic acid and its salts may be employed as a mixture. It is also possible to employ the ingredient in combination with other disinfectants or preservatives such as sorbic acid and its derivatives, nitrofuran derivatives, p-hydroxybenzoic acid esters, dialkyl pyrocarbonates, dehydroacetic acid and its derivatives, hydrogen peroxide and the like.

As regards the timing of addition of the active ingredient, if the substrate is a fermented food, it is desirable to add the active ingredient evenly to the substrate towards the end of the production process. There is no rule as to the timing of addition; only the qualification that a sufficient antimicrobial effect be attained without adversely affecting the quality of the substrate.

When the active ingredient, 2,6-dihydroxy-3,5-di-tert. butylbenzoic acid or its salts are employed for the preservation an disinfection of food, a concentration of 0.00001% to 0.1% by weight is desirable, and 0.0005% to 0.05% is more desirable.

In the case of other substrates, e.g. detergents and cosmetics, the object of the invention may be fully accomplished with the use of a concentration of 0.01% to 20% by weight, more desirably 0.1% to 5% by weight of the active ingredient. However, the proper amount of the active ingredient depends upon the type of starting materials used and other factors, and the present active ingredient may be used in an amount either over the upper limit or below the lower limit mentioned above.

2,6-dihydroxy-3,5-di-tert.butylbenzoic acid and its salts have 1000 times as much antimicrobial activity as salicylic acid and have about the same toxicity as that of salicylic acid.

In the following reference and examples, the relationship between part(s) by weight and part(s) by volume is the same as that between gram(s) and milliliter(s).

REFERENCE 1

In 12 parts by volume of dimethyl formamide is dissolved 5 parts by weight of 4,6-di-tert.butyl resorcinol, followed by adding 1.56 parts by weight of anhydrous potassium carbonate. Carbon dioxide is passed into the mixture on an oil bath under heating at 180° C. with stirring for 7 hours. To the resultant is added 50 parts by volume of water, followed by stirring for a while. The mixture is subjected to filtration, and the residue is washed with water. The washing is combined with the filtrate and the mixture is adjusted to pH 1–1.5 with conc. hydrochloric acid, whereby yellowish precipitates are formed. The precipitates are recrystallized from an aqueous alcohol to obtain 1.5 parts by weight of 2,6-dihydroxy-3,5-di-tert.butylbenzoic acid as pale yellowish crystals. Melting point 173.5° C. (decomp.).

EXAMPLE 1

Activity against hiochii-bacteria

Portions of refined sake were inoculated with *Lactobacillus homohiochii*, *Lactobacillus heterohiochii*, *Lactobacillus fermentum* α and *Lactobacillus acidophilus*, respectively, followed by the addition of 2,6-dihydroxy-3,5-di-tert.butylbenzoic acid. The sake samples were allowed to stand in an incubator at 32° C. for 60 days and the growth of each hiochii-bacterium was observed. The results of Table 1 inidicate that the present ingredient is more inhibitory to the hiochii-bacteria than salicylic acid. A sensory evaluation test was conducted to evaluate the influence of 2,6-dihydroxy-3,5-di-tert.butylbenzoic acid upon the flavor of the refined sake. The returns made by the eight panelists were analyzed and the result is shown in Table 2. It will be apparent that the present ingredient is practically useful.

TABLE 1

|  | Minimum inhibitory concentration against hiochii-bacteria (mg./ml.) ||
| --- | --- | --- |
|  | Salicylic acid | 2,6-dihydroxy-3,5-di-tert. butylbenzoic acid |
| *Lact. homohiochii* | 0.25 | 0.00015 |
| *Lact. heterohiochii* | 0.25 | 0.00015 |
| *Lact. fermentum* α | 0.5 | 0.0003 |
| *Lact. acidophilus* | 0.5 | 0.00015 |

TABLE 2.—INFLUENCES UPON THE FLAVOR OF REFINED SAKE

| Active compound used in this invention | Minimal inhibitory concentration (mg./ml.) (A.) | Amount added— |||
| --- | --- | --- | --- | --- |
|  |  | A×0 | A×1 | A×2 |
| Control (salicylic acid) | 0.5 | − | + | + |
| 2,6-dihydroxy-3,5-di-tert. butylbenzoic acid | 0.0003 | − | − | − |

NOTE:
−=Undistinguishable from "not added".
+=Distinguishable.

EXAMPLE 2

2,6-dihydroxy-3,5-di-tert.butylbenzoic acid of this invention and salicylic acid, as control, were respectively added to 1% glucose-peptone-broth media (pH 6.0) to prepare dilution series, which are inoculated with assay organisms. The inoculated media were kept in an incubator at 33° C. for 48 hours, and the minimal inhibitory concentrations (μg./ml.) were calculated. The results of Table 3 show that the present ingredient is by far more bacteriostatic than salicylic acid. Incidentally, as will be seen from the composition of assay media, there is no deterioration in activity in the presence of protein.

|  | Minimal inhibitory concentration against bacteria (μg./ml.) ||
| --- | --- | --- |
| Assay organism | Salicylic acid | 2,6-dihydroxy-3,5-di-tert. butylbenzoic acid |
| *Staphylococcus aureus* | 250 | 5 |
| *Staphylococcus flavus* | 250 | 1 |
| *Bacillus subtilis* | 250 | 1 |
| *Bacillus cereus* | 250 | 5 |
| *Sarcina lutea* | 500 | 5 |
| *Proteus vulgaris* | 1,000 | 500 |
| *Pseudomonas aeruginosa* | 1,000 | 500 |
| *Micrococcus roseus* | 250 | 1 |
| *Corynebacterium sependonicum* | 250 | 1 |
| *Saccharomyces cerevisiae* | 500 | 500 |

EXAMPLE 3

In the conventional process for the production of kamaboko, 0.00005% by weight of 2,6-dihydroxy-3,5-di-tert.butylbenzoic acid was added as a preservative to a finish-milled paste, which was then evenly mixed and steamed. The resulting unboarded kamaboko was stored in a thermostatic container at 90% R.H. (Relative Humidity) and 30° C. The results are summarized in Table 5, which shows that the present ingredient is superior to sorbic acid (control; 0.2%) in the preservation effects.

TABLE 4

| Antimicrobial compound | Elapsed time (hour) ||||
| --- | --- | --- | --- | --- |
|  | 18 | 24 | 48 | 72 |
| Control (not contain preservatives): |  |  |  |  |
| Neto (colony on the surface of kamaboko) | − | + | ++ | ++ |
| Bad smell by erosion | − | + | ++ | ++ |
| pH | 6.4 | 6.5 | 6.8 | 7.2 |
| Sorbic acid (0.2%): |  |  |  |  |
| Neto | − | − | + | + |
| Bad smell by erosion | − | − | ± | ++ |
| pH | 6.2 | 6.2 | 6.4 | 6.9 |
| 2-(2-furyl)-3-(5-nitro-4-furyl)acrylic amide (0.00025%): |  |  |  |  |
| Neto | − | − | − | (¹) |
| Bad smell by erosion | − | − | − | ± |
| pH | 6.4 | 6.4 | 6.6 | 6.6 |
| 2,6-dihydroxy-3,5-di-tert.-butyl benzoic acid (0.00005%): |  |  |  |  |
| Neto | − | − | − | − |
| Bad smell by erosion | − | − | − | − |
| pH | 6.4 | 6.4 | 6.4 | 6.6 |

¹ Development of mold.

NOTE.——=No change; ±=Almost negligible change; +=Slight change; ++=Appreciable change; +++=Considerable change.

EXAMPLE 4

A mixture of 9.2 parts by weight of cetyl alcohol, 9.2 parts by weight of stearyl alcohol, 1.5 parts by weight of sodium lauryl-sulfate, 30 parts by volume of white petrolatum, 10 parts by volume of propylene glycol and 1.0 part by weight of 2,6-dihydroxy-3,5-di-tert.butylbenzoic acid was diluted with water to bring the total weight to 100 parts by weight. The resulting cream was topically applied to obtain excellent antimicrobial effects; for example, prevents the skin from chapping after shaving.

EXAMPLE 5

To a commercial shampoo was added an alcoholic solution of 2,6-dihydroxy-3,5-di-tert.butylbenzoic acid to a concentration of 0.3%. Shampooing with this product retarded the onset of a sweaty odor and itches as compared with the control commercial shampoo.

To obtain further evidence of this effect, the control shampoo and the shampoo containing 2,6-dihydroxy-3,5-di-tert.butylbenzoic acid were added, in an amount of 100 µg./ml., to portions of a glucose-peptone-broth medium (pH 6.0), respectively. The media were then inoculated with a mixture of *Bacillus subtilis* PCI 219 and *Staphylococcus aureus* FDA 209p, and allowed to stand in an incubator at 37° C. After 24 hours, there was observed a rampant growth of bacteria in the medium containing the control shampoo. In contrast, the medium containing the shampoo treated with 2,6-dihydroxy-3,5-di-tert.butylbenzoic acid showed no bacterial growth.

EXAMPLE 6

1000 parts by weight of refined crystal sugar and a small quantity of water were put in a pan and, after boiling, 750 parts by weight of a raw bean paste prepared in the conventional manner was added and heated.

After a large part of the water was evaporated, a thorough mixture of 0.02 part by weight of 2,6-dihydroxy-3,5-di-tert.butylbenzoic acid and 10 parts by weight of sugar was added. The entire mixture was kneaded well, followed by the addition of 750 parts by weight of raw bean paste. The mixture was further heated and kneaded. The resulting finished bean jam showed no sign of spoilage after 15 days of standing at room temperature. In contrast, the control bean jam free of a preservative putrified in 3 days.

EXAMPLE 7

A block of bean curd (tōfu) prepared in the conventional manner was cut into 12 portions of equal volume. Two groups, 6 per group, were immersed in the following steeping baths, respectively, at a constant temperature of 25° C. At time intervals, the bacterial counts were taken for each steeping bath and the condition of each portion of bean curd was observed. The results are summarized below.

| | Steeping bath | | | |
|---|---|---|---|---|
| | City water | | City water plus 10 µg./ml. of 2,6-dihydroxy-3,5-di-tert.-butyl benzoic acid | |
| Elapsed time (hour) | Bacterial count/ml. | Bean curd (tōfu) | Bacterial count/ml. | Bean curd (tōfu) |
| Immediately after immerson. | 2.3×10² | No change | | No change. |
| 5 | 9.0×10⁵ | ___do___ | | Do. |
| 24 | 1.0×10⁸ | Sour odor | 10 | Do. |
| 30 | 1.6×10⁸ | Tofu floats | 2.4×10² | Do. |
| 48 | | | 1.7×10³ | Do. |
| 72 | | | 6.3×10⁵ | The characteristic smell of tōfu is faint. |
| 96 | | | 1.1×10f | Sour odor. |

EXAMPLE 8

From commercial cream puffs, the cream only was taken out and admixed well with 0.001% of 2,6-dihydroxy-3,5-di-tert.butylbenzoic acid. Along with a control sample free of the preservative, the sample was kept in an incubator at 30° C. It was discovered that whereas the control putrefied in 18 hours, the sample treated with the active ingredient of this invention showed only a slight change in smell after 4 days.

EXAMPLE 9

99 parts by weight of flakes of a higher fatty acid alkali metal salt (soap) was mechanically admixed well with 1 part by weight of 2,6-dihydroxy-3,5-di-tert.butylbenzoic acid, followed by the addition of a small amount of perfume. The mixture was molded to obtain a toilet soap having a satisfactory disinfecting effect. To evaluate the antimicrobial activity of this soap, a cotton fabric, 3 cm. square, was immersed in a 1% aqueous solution of the soap (active ingredient: 100 µg./ml.) for 10 minutes. The fabric thus treated was raised out of the bath and dried. A similar cotton fabric was treated with a similar soap solution which did not contain the active ingredient.

Those cotton fabrics were placed on a broth-agar plate inoculated with *Staphylococcus aureus* FDA 209p, which was then incubated at 37° C. for 24 hours. It was found that whereas the microorganism did not grow on the cotton fabric which had been treated with the soap solution containing the active ingredient of this invention and even a zone of inhibition was formed on and around the fabric, the organism gave a good growth all over the control fabric.

EXAMPLE 10

In the routine brewery practice for the production of refined sake and immediately after pasteurization, 2 parts by volume of an ethanolic solution containing 0.02% of 2,6-dihydroxy-3,5-di-tert.butylbenzoic acid was added to 1000 parts by volume of refined sake from which the raw sediment had been drawn off. Then, $\frac{1}{100}$ part of refined sake which had been inoculated with hiochii-bacteria was added, and the mixture was stored in an incubator at 30° C. After 60 days, there was observed no turbidity due to hiochii-degradation.

No turbidity was observed when sodium 2,6-dihydroxy-3,5-di-tert.butylbenzoate was used in place of 2,6-dihydroxy-3,5-di-tert.butylbenzoate acid.

EXAMPLE 11

A sample of compound sake prepared in the conventional manner was pasteurized in the conventional manner and, immediately thereafter, 0.0003 part by weight of 2,6-dihydroxy-3,5-di-tert.butylbenzoic acid was added to each 1000 parts by volume of the pasteurized sake. This product was admixed with $\frac{1}{100}$ part of compound sake which had been inoculated with hiochii-bacteria, and the mixture was allowed to stand in an incubator at 30° C. for 60 days. At the end of this incubation period, there was observed no turbidity due to hiochii degradation.

EXAMPLE 12

In the routine brewery practice for the production of draught beer and immediately after secondary fermentation, 50 parts by volume of an ethanolic solution containing 10% of 2,6-dihydroxy-3,5-di-tert.butylbenzoic acid was added to 10,000 parts by volume of the draught beer. The resulting finished beer showed no sign of spoilage after a long period of standing at room temperature. In contrast, the control draught beer free of 2,6-dihydroxy-3,5-di-tert.butylbenzoic acid putrefied in one month.

What is claimed is:

1. A method of inhibiting yeast, mold or bacterial growth in an area where such inhibition is desired which comprises applying to the area in which said growth is to be inhibited a growth inhibiting amount of 2,6-dihydroxy-3,5-di-tert.butylbenzoic acid putrified in one month.

References Cited

UNITED STATES PATENTS 2,722,483  11/1955  Winkler _____ 424—317 X

OTHER REFERENCES

Kaulla et al.: Chemical Abstracts, 1967, vol. 67, p. 2924, column 31139q.

Subject Index: July-December 1967, p. 3105S.

ALBERT T. MEYERS, Primary Examiner

V. D. TURNER, Assistant Examiner

U.S. Cl. X.R.

99—31, 92, 150 R, 156, 224, 30; 252—106, 107